United States Patent
Yun

(10) Patent No.: US 9,542,075 B2
(45) Date of Patent: Jan. 10, 2017

(54) METHOD AND SERVER FOR MANAGING DOMAIN-SPECIFIC TOOLBAR BUTTON AUTOMATICALLY

(71) Applicant: NHN Corporation, Seongnam-si (KR)

(72) Inventor: Chan Ho Yun, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 149 days.

(21) Appl. No.: 13/941,850

(22) Filed: Jul. 15, 2013

(65) Prior Publication Data

US 2014/0019872 A1 Jan. 16, 2014

(30) Foreign Application Priority Data

Jul. 13, 2012 (KR) .......................... 10-2012-0076768

(51) Int. Cl.
*G06F 3/0482* (2013.01)
*G06F 11/34* (2006.01)
*G06F 9/445* (2006.01)
*G06F 17/30* (2006.01)
*G06F 9/44* (2006.01)

(52) U.S. Cl.
CPC .............. *G06F 3/0482* (2013.01); *G06F 8/65* (2013.01); *G06F 9/4443* (2013.01); *G06F 11/3438* (2013.01); *G06F 17/30876* (2013.01)

(58) Field of Classification Search
CPC ... G06F 8/65; G06F 11/3438; G06F 17/30876
See application file for complete search history.

(56) References Cited

U.S. PATENT DOCUMENTS

| | | | | |
|---|---|---|---|---|
| 5,644,739 | A | * | 7/1997 | Moursund ..................... 715/840 |
| 2002/0063735 | A1 | * | 5/2002 | Tamir et al. ................. 345/745 |
| 2005/0114789 | A1 | * | 5/2005 | Chang et al. ................ 715/779 |
| 2006/0178868 | A1 | * | 8/2006 | Billerey-Mosier ............... 704/9 |
| 2006/0253586 | A1 | * | 11/2006 | Woods ............. G06F 17/30867 709/226 |
| 2009/0144723 | A1 | * | 6/2009 | Hartin ...................... G06F 8/65 717/173 |

(Continued)

FOREIGN PATENT DOCUMENTS

| | | |
|---|---|---|
| KR | 10-0820373 | 4/2008 |
| KR | 10-2011-0123027 A | 11/2011 |

OTHER PUBLICATIONS

Liuxz Software, Jun. 18, 2011, http://web.archive.org/web/20110613113935/http:/liuxz.com/index.htm.*

(Continued)

*Primary Examiner* — Kieu Vu
*Assistant Examiner* — Roberto Borja
(74) *Attorney, Agent, or Firm* — Greer Burns & Crain Ltd.

(57) ABSTRACT

Provided is a method and server for providing a button configuration of a toolbar specific to an individual domain address in an electronic device in which the toolbar is installed. The toolbar button management method for automatically configuring a domain-specific button may include obtaining a domain address through a web browser, determining whether the domain address is preset, changing a button configuration of the toolbar automatically based on button configuration information when the domain address is determined to be preset, and displaying the changed button configuration of the toolbar.

17 Claims, 8 Drawing Sheets

(56) References Cited

U.S. PATENT DOCUMENTS

2010/0070928 A1* 3/2010 Goodger .......... G06F 17/30905
715/838
2010/0169443 A1* 7/2010 Roundtree .......... G06Q 10/107
709/206

OTHER PUBLICATIONS

Google, Apr. 10, 2013, https://web.archive.org/web/20110410033246/http:/toolbar.google.com/buttons/apis/howto_guide.html.*
Korean Office Action issued in corresponding Korean Patent App. No. 10-2012-0076768, issued on Jan. 12, 2015.

* cited by examiner

METHOD AND SERVER FOR MANAGING DOMAIN-SPECIFIC TOOLBAR BUTTON AUTOMATICALLY

CROSS REFERENCE TO RELATED APPLICATION

This application claims priority from and the benefit of Korean Patent Application No. 10-2012-0076768, filed on Jul. 13, 2012, which is hereby incorporated by reference for all purposes as if fully set forth herein.

BACKGROUND OF THE INVENTION

Field of the Invention

Exemplary embodiments relate to a toolbar button management method performed in an electronic device in which a toolbar is installed, and to a method and server for managing a button configuration of the toolbar.

Discussion of the Background

A web browser is a program designed to enable users to access, retrieve, and view information on the Internet. Users can view information provided by website servers through an electronic device (e.g., a desktop personal computer (PC), laptop, smart phone, smart television (TV), and electronic pad) equipped with a web browser.

Conventionally, to obtain information using a web browser, a connection to a server is required, and a user may have to enter an address into an address window in order to connect to a server. The address may be input in a form of a uniform resource location (URL), for example, a domain name or an Internet Protocol (IP) address. For example, when a user desires to connect to a website of a particular blog, the user may input an address for the blog, such as "http://blog.AAA.com/BBB", into an address window of the web browser.

However, a tedium of typing in an address each time a user would like to access a website, incorrect recognition of desired information or an address of a website in which the desired information is placed, and a need to conduct a separate keyword search may result in user inconvenience of having to conduct a keyword search after linking to a portal site by entering an address of the portal site.

To resolve these issues, a toolbar service may be provided to users by a content provider. A toolbar is a tool designed to allow users to conduct a quick and easy operation (e.g., search) on the Internet using a web browser, and may include a keyword input window and buttons having various additional functions that are activated at a predetermined area of a web browser.

However, a conventional toolbar only provides users a general convenience over websites on the Internet, and there is a need for providing a customized service for individual websites.

The above information disclosed in this Background section is only for enhancement of understanding of the background of the invention and therefore may contain information that does not form the prior art that is already known to a person of ordinary skill in the art.

SUMMARY OF THE INVENTION

Exemplary embodiments provide a method and server that may change a button configuration of a toolbar to a button configuration specific to a domain address when a website is accessed from an electronic device in which the toolbar is installed.

Exemplary embodiments also provide a method and server that may change an arrangement of buttons or add a button based on a button configuration of a toolbar specific to a domain address, in an electronic device in which the toolbar is installed.

Exemplary embodiments also provide a method and server that may preset, using an Administration (Admin) Tool, a button configuration of a toolbar specific to a domain address accessed via a web browser from an electronic device in which the toolbar is installed.

Exemplary embodiments also provide a method and server that periodically updates a button configuration of a toolbar specific to a domain address accessed with a web browser from an electronic device in which the toolbar is installed.

Additional features of the invention will be set forth in the description which follows, and in part will be apparent from the description, or may be learned by practice of the invention.

Exemplary embodiments of the invention disclose a toolbar button management method performed by a processor in an electronic device. The method includes obtaining a is domain address, determining, using the processor, whether the domain address is preset, setting, using the processor, a button configuration of the toolbar based on button configuration information in response to the domain address being determined as preset, and displaying the changed button configuration of the toolbar.

Exemplary embodiments of the invention disclose a toolbar button management server. The toolbar button management server includes a non-transitory computer-readable storage medium, a communication device, and a processing device. The non-transitory computer-readable storage medium is configured to register and preset button configuration information for each domain address. The communication device is configured to receive, from an electronic device in which a toolbar is installed, a request to determine whether a domain address is preset. The processing device is configured to determine whether the domain address is preset in response to the request being received, and to verify whether the button configuration information is stored in the non-transitory computer-readable storage medium. The communication device is configured to transmit the button configuration information corresponding to the domain address to the electronic device in response to the domain address being determined to be preset.

Exemplary embodiments of the invention disclose one or more non-transitory computer-readable storage media having stored thereon a computer program that, when executed by one or more processors, causes the one or more processors to obtain a domain address, determine whether the domain address is preset, change a button configuration of the toolbar based on button configuration information in response to the domain address being determined to be preset, and display the changed button configuration of the toolbar.

It is to be understood that both the foregoing general description and the is following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
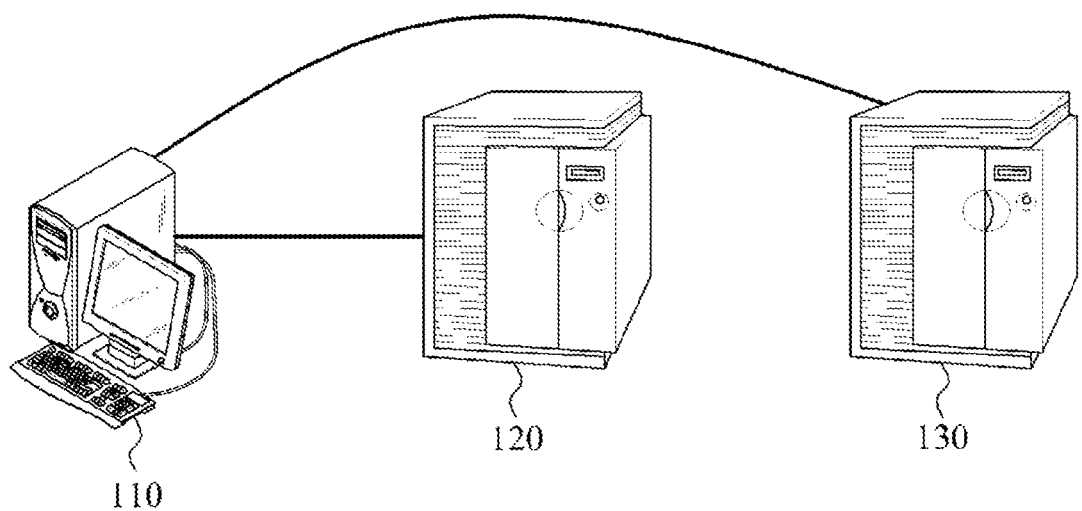
FIG. 1 is a schematic diagram illustrating a system including an electronic device in which a toolbar is installed, a toolbar button management server, and a website server according to exemplary embodiments of the invention.

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing.

Hereinafter, exemplary embodiments of the invention will be described in detail with reference to the accompanying drawings.

FIG. 1 is a schematic diagram illustrating a system including an electronic device 110 on which a toolbar is installed, a toolbar button management server 120, and a website server 130 according to exemplary embodiments of the invention.

Referring to FIG. 1, the electronic device 110 may be, for example, a desktop personal computer (PC), a laptop PC, a smart phone, a smart TV, an electronic pad, and, in general, any electronic device through which a button configuration of a toolbar may be changed by connecting to the toolbar button management server 120 using the toolbar. The electronic device 110 may display a toolbar through a web browser, may obtain an address of the website through a web browser, may determine whether the address is preset, and may change and display a button configuration of a toolbar automatically based on button configuration information registered in the toolbar button management server 120 if the address is determined to be preset. One or more components of the electronic device 110, including, for example, a processor and/or a display unit of the electronic device 110, may be used to execute functions and operations of the electronic device 110.

The toolbar button management server 120 may correspond to a server configured to communicate with the electronic device 110 using the toolbar, and may register and preset button configuration information for each domain address. For example, a server administrator may register or update button configuration information in the toolbar button management server 120 using an Admin Tool, and button configuration information for each domain address may be stored in an internal storage medium or a database of the toolbar button management server 120.

The toolbar button management server 120 may determine whether a button configuration of a toolbar for an individual domain address is preset, and may transmit a result of the determination to the electronic device 110, or may transmit button configuration information for an individual domain address to the electronic device 110 to enable the electronic device 110 to determine whether a button configuration of a toolbar for the individual domain address is preset.

The website server 130 may correspond to a server that hosts a website to which the electronic device 110 connects through a web browser. A user may access a website by entering a domain address of the website server 130. The domain address may be input in a form of a uniform resource location (URL), for example, a domain name, or an Internet Protocol (IP) address. The website server 130 may be any combination of hardware and software components configured to operate as described hereinabove. For example, the website server 130 may include a storage medium configured to store information on a plurality of websites. The stored information may include URL, access information, and publication and storage information of the plurality of websites.

Figure 2:
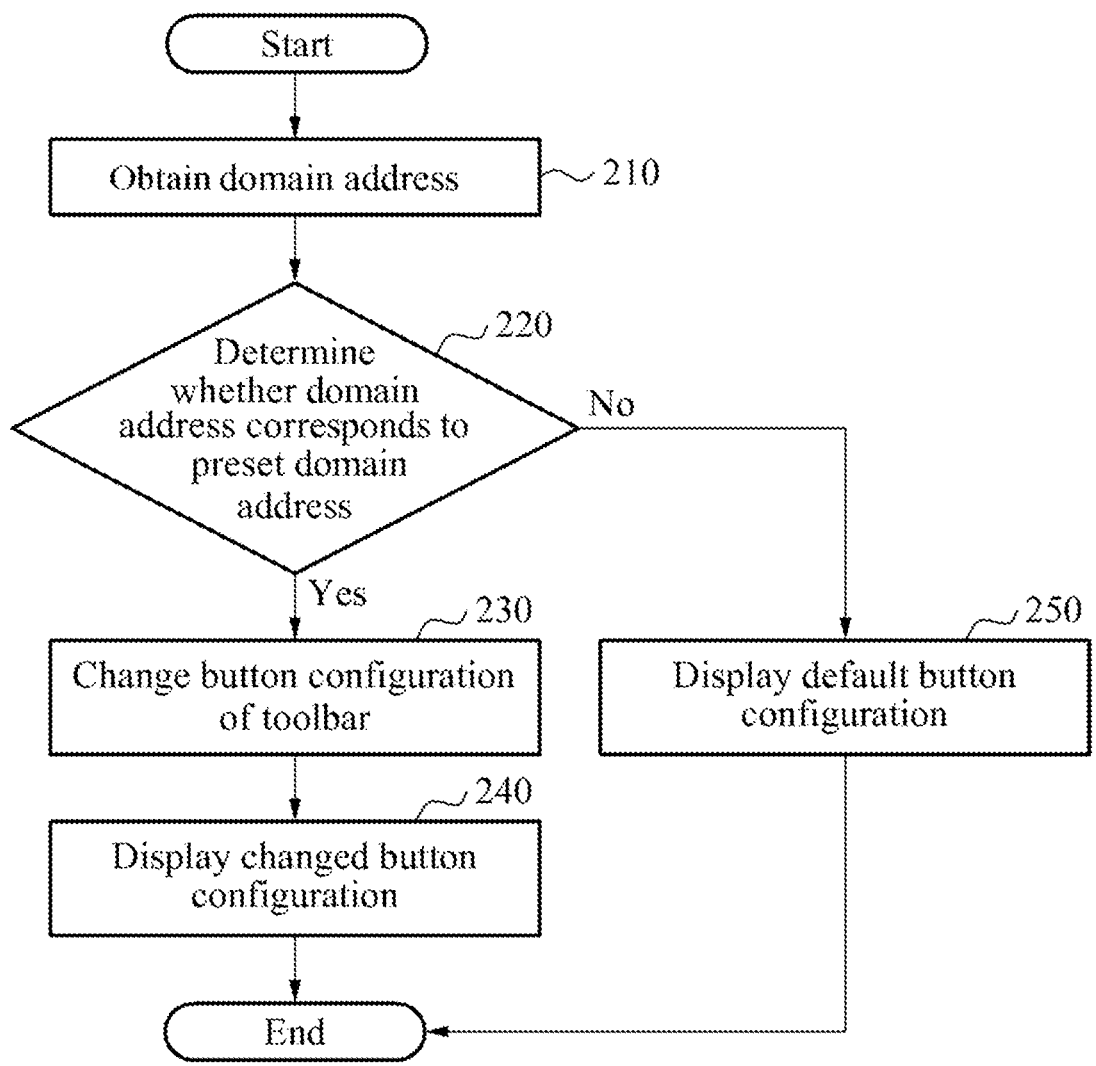
FIG. 2 is a flowchart illustrating a method of changing a button configuration of a toolbar to a button configuration specific to an individual domain address according to exemplary embodiments of the invention.

FIG. 2 is a flowchart illustrating a method of changing a button configuration of a toolbar to a button configuration specific to an individual domain address according to exemplary embodiments of the invention.

Referring to FIG. 2, a domain address of a website being accessed through a web browser may be obtained (210). The web browser may correspond to a program that may support a World Wide Web (WWW) service, and may include a program designed to retrieve and present hypertext described using Hypertext Markup Language (HTML). Examples of web browsers include Internet Explorer®, Chrome™, Firefox®, Safari®, and the like.

Next, a determination is made as to whether the obtained domain address corresponds to a preset domain name (220). For example, if button configuration information of a toolbar specific to the obtained domain address is set in advance, the domain address may be determined to be preset. In some cases, the toolbar button management server 120 may be requested, using the toolbar, to determine whether the domain address obtained through the web browser is preset. In some cases, the electronic device 110 may determine whether the obtained domain address is preset after the electronic device 110 downloads button configuration information of the toolbar for an individual domain address from the toolbar button management server 120. Button configuration information may include, for example, information necessary to provide a location of a button of the toolbar, an arrangement of the button, a function of the button, and a function being used in web browsing through the toolbar. The button configuration information may also include information for changing button arrangement by moving the button and information for changing the button configuration of the toolbar by replacing the button with another button or by adding another button.

The determination as to whether the obtained domain address is preset may be made using information used to provide an optimal toolbar button. The information may include, for example, a domain address, a script included in a website, and data used to specify a category of a website corresponding to a domain address. The category of the website may include blogs, news, and games, and an optimal button configuration may be provided for each category.

Next, the button configuration of the toolbar may be changed automatically to a configuration specific to the obtained domain address based on the button configuration information, if the obtained domain address is determined to be preset (230). A format of the is button configuration information of the toolbar may be based on an eXtensible Markup Language (XML). The button configuration information of the toolbar may be transmitted to electronic device 110, which has the toolbar installed.

In some cases, a user may select whether the button configuration of the toolbar is to be changed automatically. For example, the button configuration of the toolbar may be set by a user selecting the option to perform an automatic change to ON or OFF through an environment settings menu or an option provided in the toolbar. Accordingly, a function of changing the button configuration of the toolbar automatically may be activated or deactivated by selecting or unselecting an environment settings check box.

The changed button configuration of the toolbar may then be displayed on the web browser in the electronic device 110 (240). The button of the toolbar may be displayed through various suitable means, including, for example, a text, image, and a combination of text and image.

If the obtained domain address is not preset (e.g., if the button configuration information corresponding to the obtained domain address is absent), a button may be displayed according to a default button configuration (250). The default button configuration may include, but is not limited to, providing a search window, popularity ratings and information, Japanese-Korean translation, mail, and a dictionary in the toolbar. The default button configuration may be configured differently for each user. The button configuration of the toolbar may be managed by storing log-in information in a pre-generated account for each user.

Figure 3:
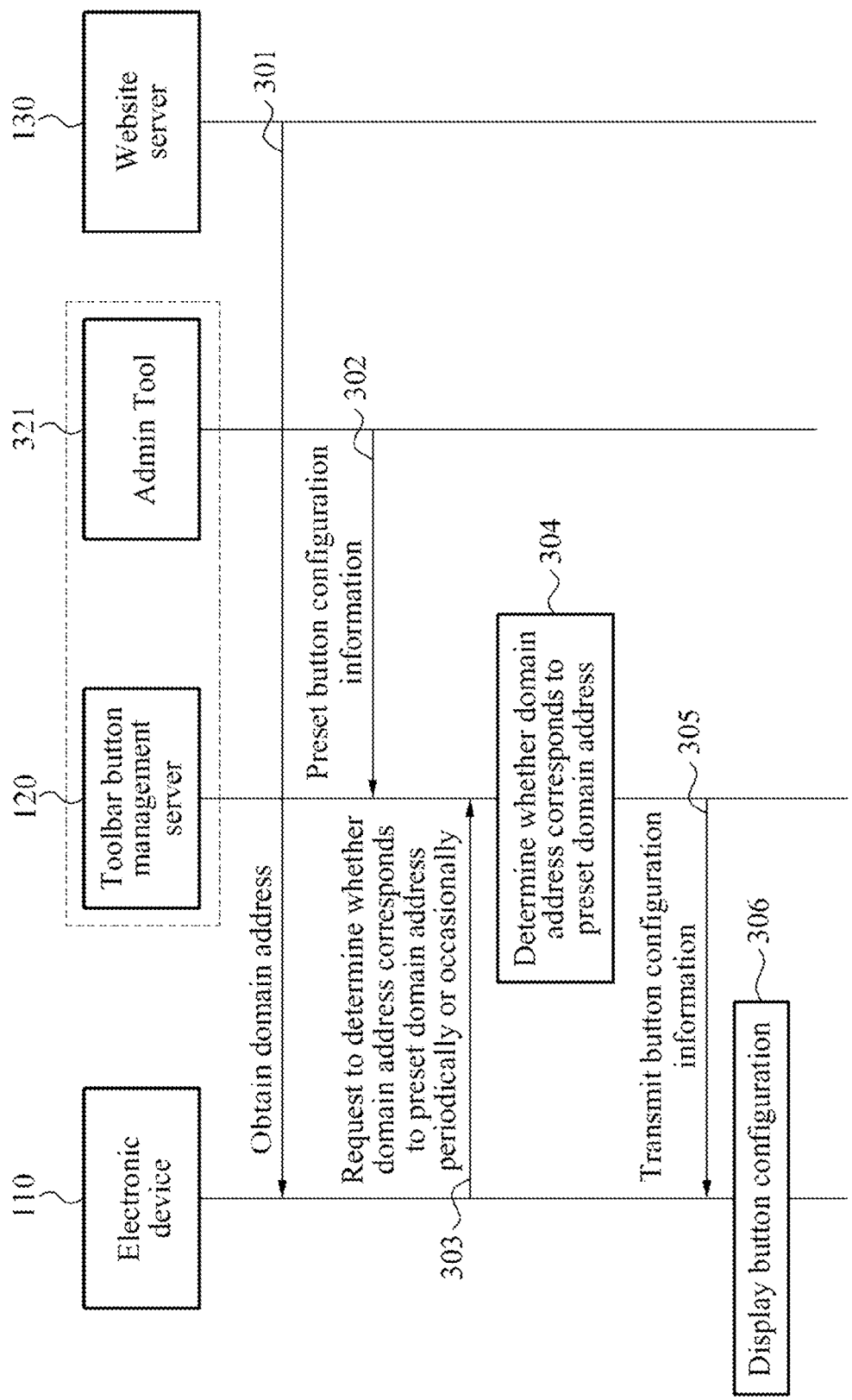
FIG. 3 is an operational flow diagram illustrating a method of changing a button configuration of a toolbar to a button configuration specific to an individual domain address according to exemplary embodiments of the invention.

FIG. 3 is an operational flow diagram illustrating a process of changing a button configuration of a toolbar to a button configuration specific to an individual domain address according to exemplary embodiments. In FIG. 3, a toolbar button management server 120 may determine whether a domain address is preset.

Referring to FIG. 3, an electronic device 110, in which a toolbar is installed, may obtain a domain address of a website being browsed on the electronic device 110 from a website server 130 (301).

Admin Tool 321 may register and preset button configuration information in the toolbar button management server 120 for each domain address (302). In some cases, the Admin Tool 321 may register and preset button configuration information set by a server administrator in the toolbar button management server 120. In some cases, the Admin Tool 321 may register and preset button configuration information, including an arrangement of buttons of the toolbar, in the toolbar button management server 120 automatically based on an Internet usage pattern of the user collected using a predetermined algorithm. The internet usage pattern may include, but is not limited to, websites browsed by the user, a search history, and images viewed by the user.

The electronic device 110 may request the toolbar button management server 120 to determine whether the domain address obtained through the web browser is preset (303). The electronic device 110 may request the toolbar button management server 120 to determine whether the domain address obtained through the web browser is preset each time the domain address is read through the web browser or periodically according to a predetermined cycle.

The toolbar button management server 120 may determine whether the domain address read through the web browser corresponds to a preset domain address, in response to the request being received from the electronic device 110 (304). The toolbar button management server 120 may conduct a comparison to verify whether button configuration information of the toolbar corresponding to the domain address is present in a database of the toolbar button management server 120. In some cases, the toolbar button management server 120 may conduct is the comparison using a portion of the domain address rather than an entire domain address. For example, the toolbar button management server 120 may determine whether the domain address obtained through the web browser is preset, using a portion "http://blog.AAA.com/" of a domain address "http://blog.AAA.com/BBB/12409856".

The toolbar button management server 120 may transmit the button configuration information to the electronic device 110 (305). Since a determination as to whether the domain address is preset has been determined by the toolbar button management server 120, only the button configuration information for the domain address obtained through the web browser may be transmitted, rather than all button configuration information stored in the toolbar button management server 120, resulting in reduction in traffic consumed.

The electronic device 110 in which the toolbar is installed may display the toolbar button according to the received button configuration information (306). For example, when the button configuration information for the domain address obtained through the web browser is preset, the electronic device 110 may display a changed button configuration of the toolbar. When the button configuration information for the domain address obtained through the web browser is not preset, the electronic device 110 may display an unchanged button configuration of the toolbar (e.g., a default button configuration).

Figure 4:
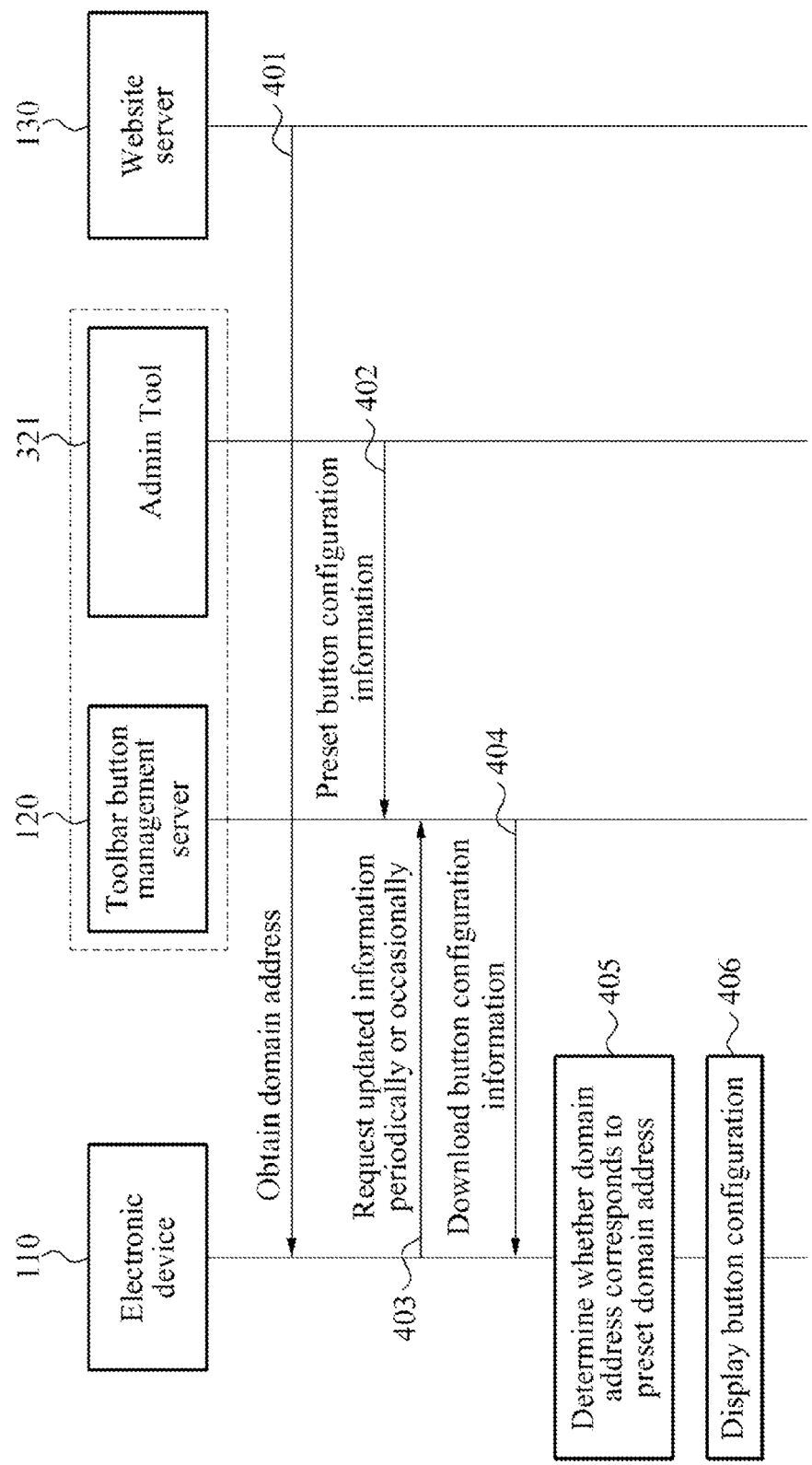
FIG. 4 is an operational flow diagram illustrating a method of changing a button configuration of a toolbar to a button configuration specific to an individual domain address according to exemplary embodiments of the invention.

FIG. 4 is an operational flow diagram illustrating a process of changing a button configuration of a toolbar to a button configuration specific to an individual domain address according to exemplary embodiments of the invention. 401, 402, and 406 in FIG. 4 may be the same as 301, 302, and 306 in FIG. 3. A repeated detailed description of elements in FIG. 4 that are similar to elements in FIG. 3 is omitted herein. Accordingly, a detailed description of 401, 402, and 406 will be omitted herein is below.

Referring to FIG. 4, an electronic device 110 in which a toolbar is installed may request button configuration information of the toolbar to a toolbar button management server 120 (403). The electronic device 110 may request the toolbar button management server 120 to determine whether the domain address obtained through a web browser is preset each time the domain address is read through the web browser or periodically according to a predetermined cycle. The predetermined cycle may be set to be a day, seven days, two weeks, one month, and, in general, any time period based on environment settings by a user.

The electronic device 110 may download the requested button configuration information of the toolbar from the toolbar button management server 120 (404). In some cases, the electronic device 110 may download button configuration information for all preset domains. In some cases, the electronic device 110 may verify and download current button configuration information periodically according to the predetermined cycle so that traffic may be reduced by updating the button configuration information periodically.

The electronic device 110 may determine whether the domain address is preset (405). The electronic device 110 may determine whether the domain address is preset by conducting a comparison to verify whether button configuration information of the toolbar corresponds to the domain address present in a storage medium of the electronic device 110.

Figure 5:
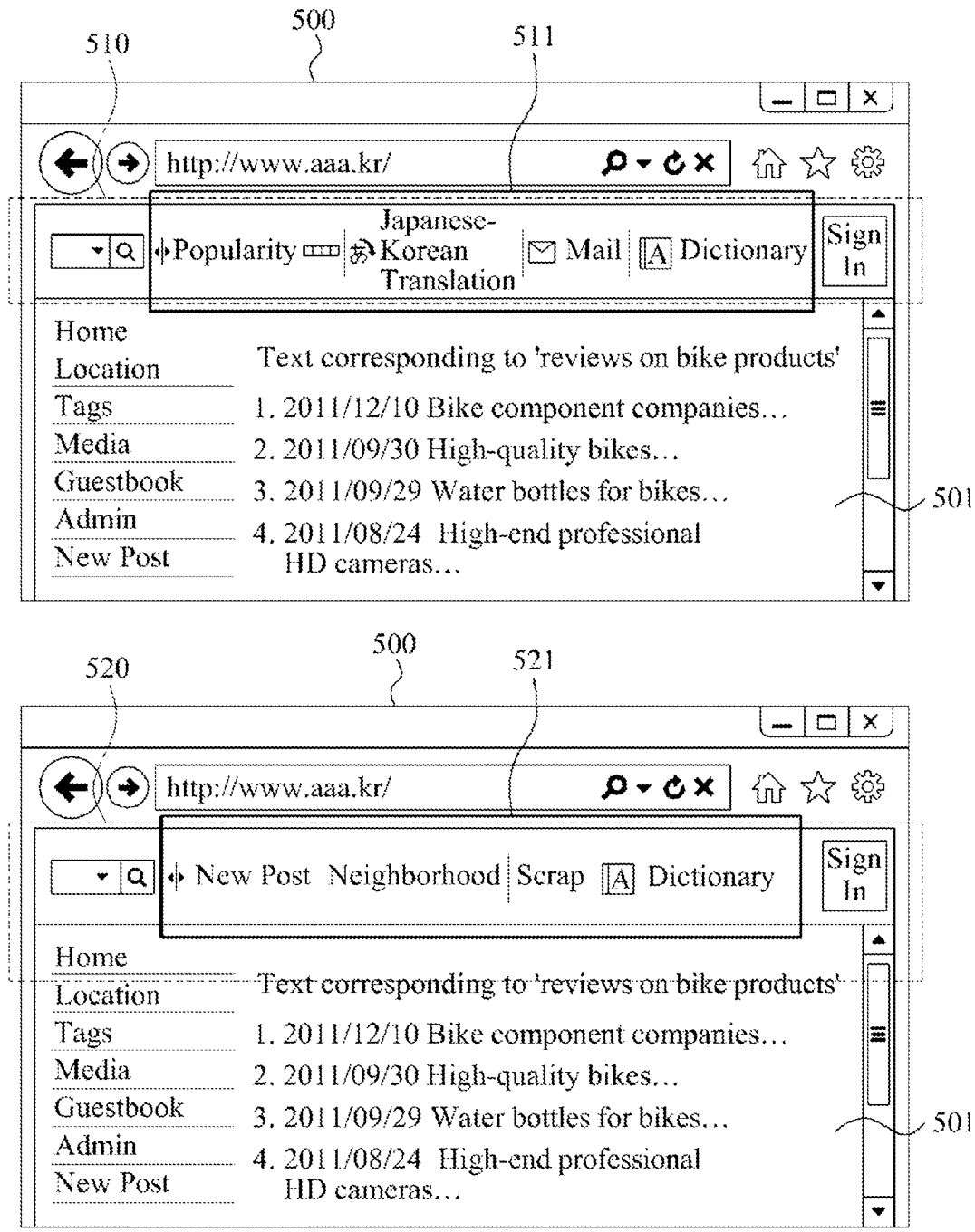
FIG. 5 illustrates screenshots of changing a button configuration of a toolbar to a button configuration specific to an individual domain address according to exemplary embodiments of the invention.

FIG. 5 illustrates screenshots of changing a button configuration of a toolbar to a button configuration specific to an individual domain address according to exemplary embodiments of the invention. A toolbar 510 is installed on a web browser 500, and may display a general button configuration 511 and a search window. The website 501 may be categorized, for example, as a Blog. The button configuration 511 provided in the toolbar 510 may include buttons having a low correlation with the website 501. For example, contents of the toolbar 510, such as popularity, Japanese-Korean translation, mail, and a dictionary, may not be related to contents of the website 501. When the domain address is not present, the button configuration 511 may be displayed as a default button configuration, as shown in toolbar 510 of FIG. 5.

If the domain address is preset, a button configuration 521 of a toolbar 520 may be changed automatically to an optimal button configuration for the domain address. For example, the button configuration of the toolbar 520 may be changed by moving a button, by replacing a button with another button, or by adding another button. Since the website 501 corresponds to a blog, the button configuration 521 may be changed automatically to an optimal button configuration for a blog to include buttons related to blogs, such as, for example, blogspot, New Post, Neighborhood, and Scrap buttons. The button configuration 521 may be an example of a button configuration changed from the default button configuration 511.

Figure 6:
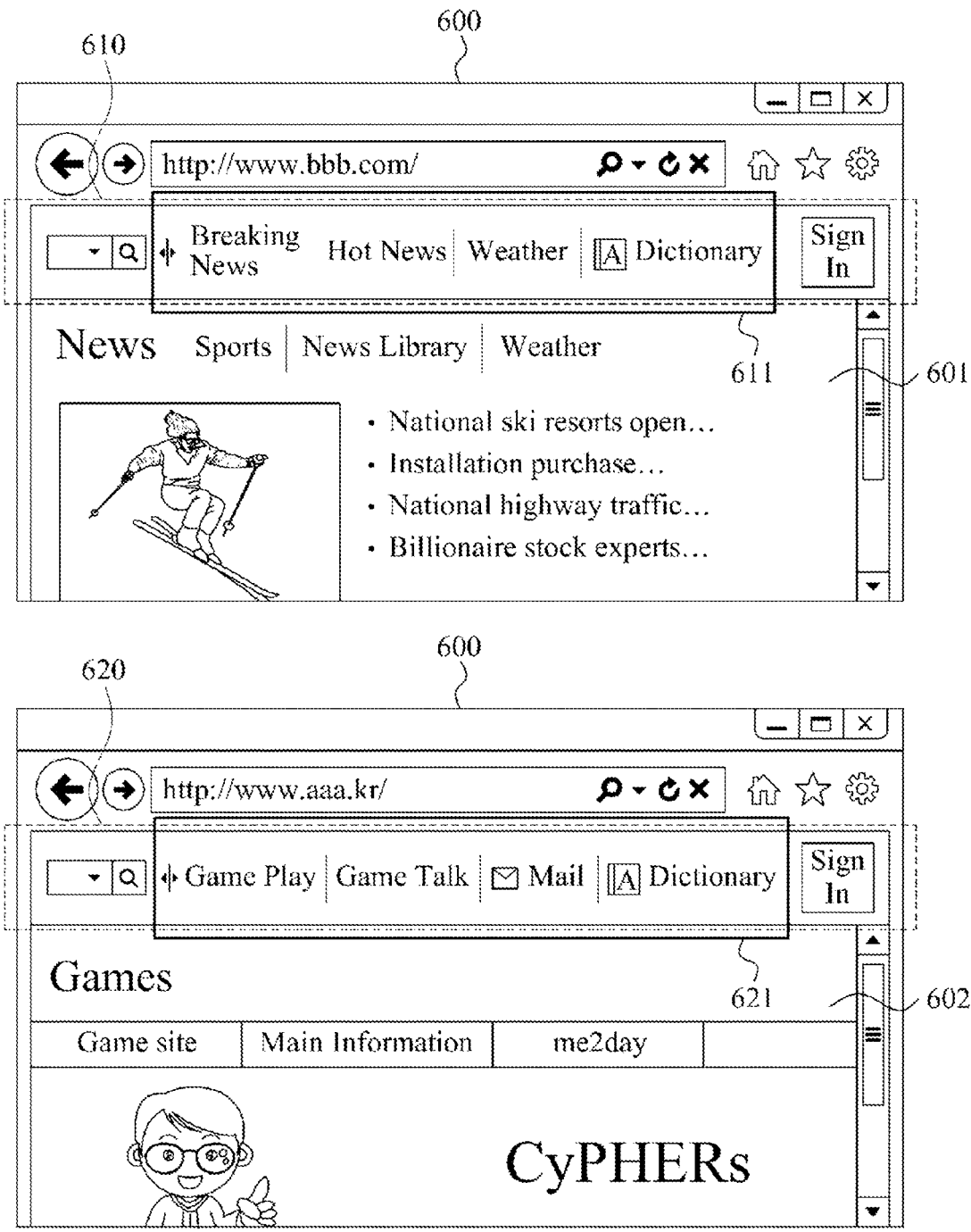
FIG. 6 illustrates screenshots according to another example of changing a button configuration of a toolbar to a button configuration specific to an individual domain address according to exemplary embodiments of the invention.

FIG. 6 illustrates screenshots according to another example of changing a button configuration of a toolbar to a button configuration specific to an individual domain address according to exemplary embodiments of the invention.

In some cases, a domain address of web browser 600 may be categorized as news, and an optimal button configuration for a news website 601 may be provided. A button configuration 611 of a toolbar 610 may be changed automatically to include buttons such as, for example, breaking news, hot news, and weather.

In some cases, a domain address of web browser 600 may be categorized as a game, and an optimal button configuration for a game website 602 may be provided. A button configuration 621 of a toolbar 620 may be changed automatically to include buttons such as, for example, game play, and game talk.

Figure 7:
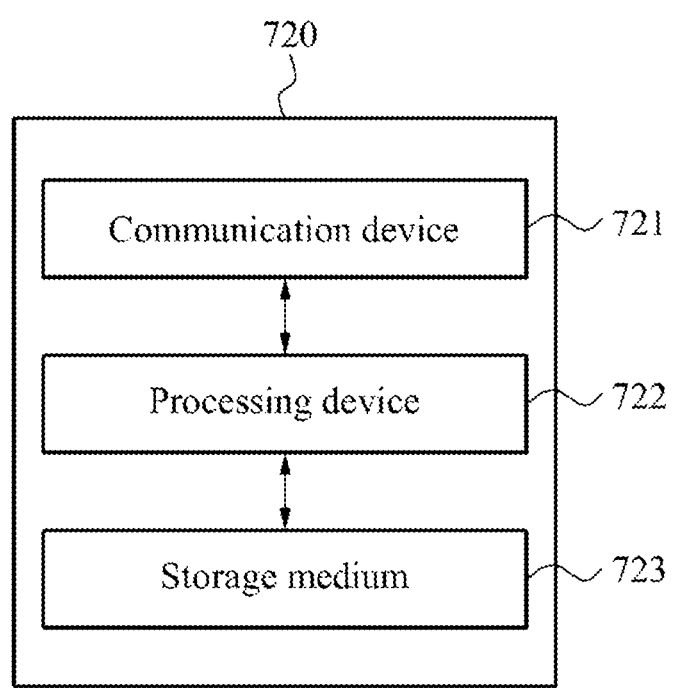
FIG. 7 is a block diagram illustrating a toolbar button management server according to exemplary embodiments of the invention.

FIG. 7 is a block diagram illustrating a toolbar button management server 720 according to exemplary embodiments of the invention. Referring to FIG. 7, the toolbar button management server 720 may include a communication device 721, a processing device 722, and a storage medium 723. The toolbar button management server 720 may correspond to the toolbar button management server 120 in FIG. 1.

The communication device 721 may include a device for receiving information and data from the electronic device 110. For example, the communication device 721 may be a transceiver configured to send and receive data to any device (e.g., electronic device 110). In some cases, the communication device 721 may have a transmitter and a receiver, as separate components, and, in some cases, the transmitter and receiver may be integrated as one. The communication device 721 may receive a request to verify whether updated button configuration information is uploaded and a request to determine whether a domain address obtained through a web browser is preset. The communication device 721 may transmit button configuration information of a toolbar, and may provide an optimal button configuration for an individual domain address.

The processing device 722 may process operations of a program stored in the storage medium 723, and may include a central processing unit (CPU) and a microprocessor. The processing device 722 may determine whether a requested domain address is preset in response to a request being received through the communication device 721, and may conduct a comparison to verify whether button configuration information of the toolbar corresponding to the domain address is present in the storage medium 723.

The storage medium 723 may correspond a computer-readable storage medium is including instructions to enable the processing device 722 to execute various operations including, for example, an operation for registering and presetting button configuration information using Admin Tool 321 for each domain address, an operation for receiving a request to determine whether a domain address read through a web browser is preset from the electronic device 110 in which a toolbar is installed, an operation for determining whether the domain address is preset in response to the request being received, and an operation for transmitting button configuration information corresponding to the domain address to the electronic device 110 in which the toolbar is installed when the domain address is determined to be preset. The storage medium 723 may include, for example, a hard disc, a solid state drive (SSD), and other hardware via which a program may be stored.

The storage medium 723 may also store and update the button configuration information of a toolbar for an individual domain address registered and preset using Admin Tool 321.

Figure 8:
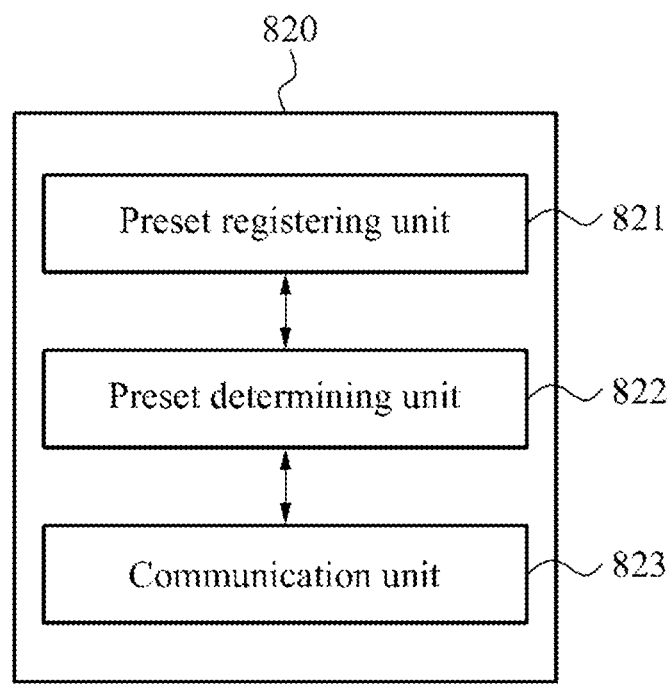
FIG. 8 is a block diagram illustrating a toolbar button management server according to exemplary embodiments of the invention.

FIG. 8 is a block diagram illustrating a toolbar button management server 820 according to exemplary embodiments of the invention. Referring to FIG. 8, the toolbar button management server 820 may include a preset registration unit 821, a preset determination unit 822, and a communication unit 823. The toolbar button management server 820 may correspond to the toolbar button management server 120 in FIG. 1.

The preset registration unit 821 may register, preset, and/or update button configuration information for each domain address using Admin Tool 321.

The preset determination unit 822 may determine whether a domain address obtained through a web browser is preset in response to a request being received from electronic device 110 in which a toolbar is installed.

The communication unit 823 may receive, from the electronic device 110 in which the toolbar is installed, a request to determine whether the domain address obtained through the web browser is preset or a request to verify whether updated button configuration information is uploaded, and may transmit preset button configuration information to the electronic device 110.

The system and components described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage is medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy discs, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

According to exemplary embodiments, a user may conduct a fast and simple website search using a toolbar.

According to exemplary embodiments, a user may conduct a website search involving a minimum amount of time and cost using a toolbar having an optimal button configuration for each individual domain address.

A number of examples have been described above. Nevertheless, it will be understood that various modifications may be made. For example, suitable results may be achieved if the described methods are performed in a different order and/or if components in a described system, architecture, device, or circuit are combined in a different manner and/or replaced or supplemented by other components or their equivalents. Accordingly, other is implementations are within the scope of the following claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A toolbar button management method performed by a processor in an electronic device, the method comprising:
   obtaining a domain address of a website being accessed by a user through a web browser;
   determining, using the processor, whether the obtained domain address is preset by querying a database of a management server using the obtained domain address, and verifying preset button configuration information corresponding to the obtained domain address is stored in the management server;

setting, using the processor, a button configuration of a toolbar of the website based on the preset button configuration information corresponding to the obtained domain address when the obtained domain address is determined to be preset;

setting, using the processor, the button configuration of the toolbar of the website based on default button configuration information set by the user, when the obtained domain address is determined not to be preset; and displaying the set button configuration of the toolbar and a configuration of other elements of the web browser, wherein the button configuration of the toolbar is set and displayed without reconfiguring the other displayed elements of the web browser, and wherein an administration tool automatically registers and presets button configuration information in the management server based on an Internet usage pattern of the user.

2. The toolbar button management method of claim 1, wherein determining whether the obtained domain address is preset further includes connecting to the management server.

3. The toolbar button management method of claim 1, wherein determining whether the domain address is preset comprises downloading the preset button configuration information to the electronic device by connecting to the management server using the toolbar.

4. The toolbar button management method of claim 3, wherein downloading the preset button configuration information to the electronic device by connecting to the management server using the toolbar comprises verifying whether updated preset button configuration information is uploaded to the management server and updating the preset button configuration information periodically.

5. The toolbar button management method of claim 1, wherein setting the button configuration of the toolbar comprises changing an arrangement of buttons of the toolbar by moving a button of the toolbar.

6. The toolbar button management method of claim 1, wherein setting the button configuration of the toolbar comprises changing an arrangement of buttons of the toolbar by replacing a button of the toolbar with another button or by adding another button to the toolbar.

7. The toolbar button management method of claim 1, wherein a format of the preset button configuration information and the default button configuration information is based on an eXtensible Markup Language (XML).

8. The toolbar button management method of claim 1, further comprising:
setting the button configuration of the toolbar to be changed automatically according to a selection by the user.

9. The toolbar button management method of claim 1, further comprising:
presetting and registering a plurality of domain addresses on a storage medium, each of the domain addresses corresponding to respective preset button configuration information for a button configuration of a toolbar.

10. A toolbar button management server, comprising:
a non-transitory computer-readable storage medium to store registered and preset button configuration information of a toolbar for each domain address;
a communication device to receive, from an electronic device in which a toolbar is installed, a request to determine whether a domain address of a website being accessed by a user through a web browser is preset; and
a processing device to determine whether the domain address is preset in response to the request being received, to query the non-transitory computer-readable storage medium using the domain address, and to verify whether the preset button configuration information corresponding to the domain address is stored in the non-transitory computer-readable storage medium, wherein the communication device is configured to transmit the preset button configuration information corresponding to the domain address to the electronic device when the domain address is determined to be preset, wherein the communication device is configured to transmit default button configuration information set by the user, when the domain address is determined not to be preset, wherein the electronic device displays a button configuration of the toolbar based on the transmitted preset button configuration information or the transmitted default button configuration information, without reconfiguring the other elements of the web browser, and wherein an administration tool automatically registers and presets button configuration information in the management server based on an Internet usage pattern of the user.

11. The toolbar button management server of claim 10, wherein the communication device is configured to transmit the preset button configuration information or the default button configuration information to the electronic device using the toolbar.

12. The toolbar button management server of claim 10, wherein the communication device is configured to receive a request to verify whether updated button configuration information is uploaded.

13. The toolbar button management server of claim 10, wherein the communication device is configured to transmit the preset button configuration information or the default button configuration information for changing an arrangement of buttons of the toolbar by moving a button of the toolbar.

14. The toolbar button management server of claim 10, wherein the communication device is configured to transmit the preset button configuration information or the default button configuration information for changing an arrangement of buttons of the toolbar by replacing a button of the toolbar with another button or by adding another button.

15. The toolbar button management server of claim 10, wherein a format of the preset button configuration information and the default button configuration information is based on an eXtensible Markup Language (XML).

16. The toolbar button management server of claim 10, wherein the non-transitory computer-readable storage medium is configured to set the button configuration of the toolbar to be changed automatically according to a selection by the user.

17. One or more non-transitory computer-readable storage media having stored thereon a computer program that, when executed by one or more processors, causes the one or more processors to:
obtain a domain address of a website being accessed by a user through a web browser;
determine whether the obtained domain address is preset by querying a database of a management server using the obtained domain address, and verifying preset button configuration information corresponding to the obtained domain address is stored in the management server;

set a button configuration of the toolbar of the website based on the preset button configuration information corresponding to the obtained domain address, when the obtained domain address is determined to be preset;

set a button configuration of the toolbar of the website based on default button configuration information set by the user, when the obtained domain address is determined not to be preset; and display the set button configuration of the toolbar and a configuration of other elements of the web browser, wherein the button configuration of the toolbar is set and displayed without reconfiguring the other displayed elements of the web browser, and wherein an administration tool automatically registers and presets button configuration information in the management server based on an Internet usage pattern of the user.

* * * * *